June 17, 1958　　　　　R. CLARET　　　　　2,838,843
APPARATUS FOR DETERMINING THE DIRECTION OF THE
APPARENT VERTICAL ON BOARD A MOVABLE BODY
Filed May 26, 1955　　　　　　　　　　　　　4 Sheets-Sheet 1
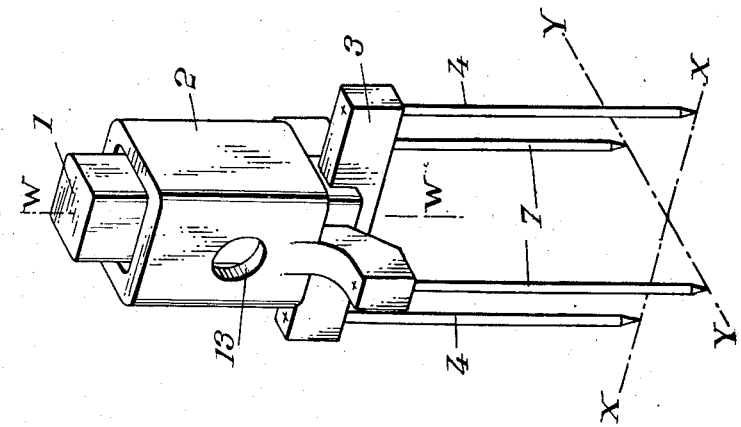
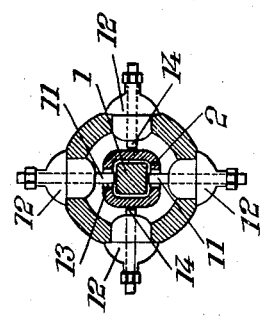

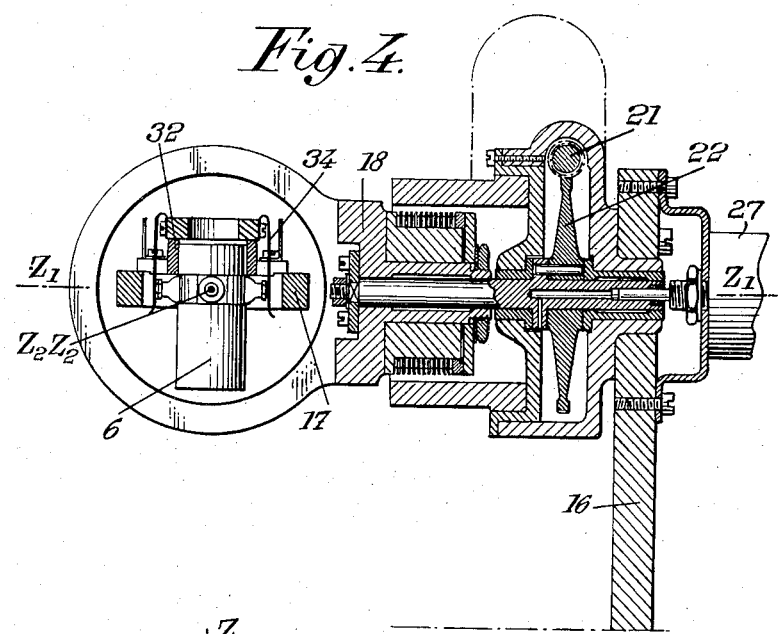
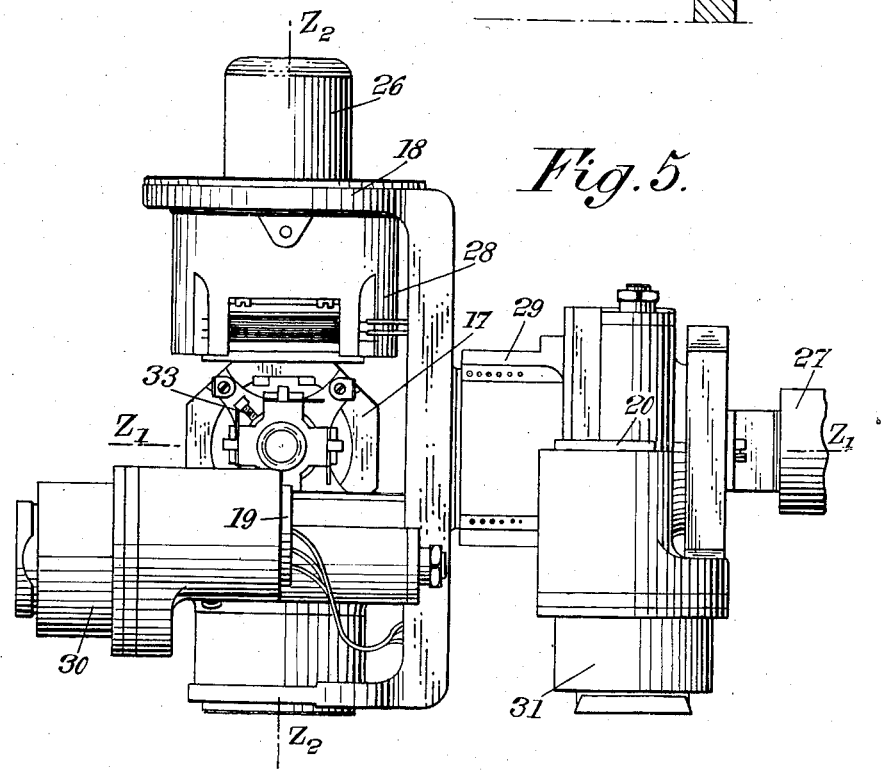

United States Patent Office 2,838,843
Patented June 17, 1958

2,838,843

APPARATUS FOR DETERMINING THE DIRECTION OF THE APPARENT VERTICAL ON BOARD A MOVABLE BODY

Rene Claret, Sceaux, France, assignor to Office National d'Etudes et de Recherches Aeronautiques O. N. E. R. A., Chatillon-sous-Bagneux (Seine), France Application May 26, 1955, Serial No. 511,149

Claims priority, application France May 29, 1954

8 Claims. (Cl. 33—206)

The present invention relates to apparatus for determining the direction of a field of force acting on a movable body, and in particular the direction of the apparent vertical on board an aircraft.

The chief object of my invention is to provide an apparatus of this kind which is better adapted to meet the requirements of practice than those existing at the present time.

The apparatus according to my invention includes a support mounted pivotably with respect to said body and in which a system of detector means is pivotally mounted so that the position of equilibrium of said detector means under the effect of said field force is unstable, the relative displacements of said detector means with respect to said support being limited and serving to control motor means which actuate said support in such manner as to tend at any time to restore said detector means into said position of equilibrium.

A preferred embodiment of my invention will be hereinafter described with reference to the accompanying drawings, given merely by way of example and in which:

Fig. 1 is an elevational view, partly in section, of an apparatus made according to an embodiment of my invention.

Fig. 2 is a cross sectional view on the line II—II of Fig. 1.

Fig. 3 is a perspective view of the detector means of Figs. 1 and 2.

Fig. 4 is a vertical sectional view on line Z—Z in Fig. 5, with the detector housing seen in elevation, of an apparatus according to my invention.

Fig. 5 is a plan view corresponding to Fig. 4.

Figure 6:
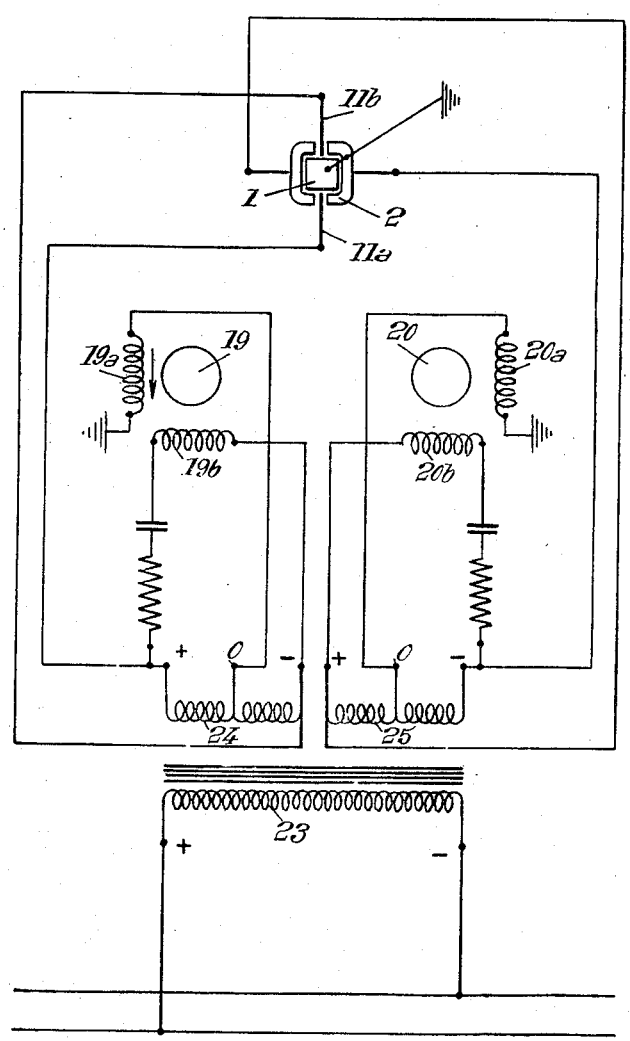
Fig. 6 shows the electrical lay-out of the apparatus of Figs. 1 to 5.

In the following description, it will be supposed that the apparatus is intended to indicate the direction of the apparent vertical on board an aircraft.

Apparatus of this kind, as made up to the present time, was of the pendular type and the detector element was in a stable position of equilibrium when it indicated the direction of the apparent vertical. If, for some reason, this detector element was deviated from said position of equilibrium, it tended always to return thereto, thus producing a series of oscillations which required the use of a damping system the presence of which increased the time of response of the apparatus to a variation of direction of the apparent vertical.

Furthermore, such apparatus was not necessarily always adapted to different characteristics of the movement of the movable body on which it was mounted.

The detector means of the apparatus illustrated in Figs. 1 to 3 is constituted by two weight members 1 and 2, pivotable respectively about two axes XX, YY, at right angles to each other and fixed with respect to a support 6 which will be hereinafter described. According to the present invention, each of these axes is located below the centre of gravity of the corresponding weight member, so that when the latter is in position of equilibrium, that is to say when the vector representing the apparent gravity applied to said centre of gravity intersects the axis of oscillation of said weight member, this position of equilibrium is unstable.

Weight member 1 is constituted by a parallelepipedic mass, for instance of platinum iridium containing 5% of iridium (such a metal having a high density and being rustproof), provided at the lower end thereof with a cross member 3 which itself rests upon two rigid and pointed rods 4 bearing on the lower end plate 5 of support 6.

Weight member 2 is constituted by a kind of sleeve of quadrangular section made of the same material as 1 and surrounding it with a very small play. Member 2 rests upon end plate 5 through rods 7 similar to rods 4 but located in a plane at right angles to the plane of said rods 4.

In said end plate 5 are provided, to accommodate rods 4 respectively, a conical recess 8 and a rectilinear groove 9 which define the pivot axis XX for weight member 1. A similar recess and a similar groove, extending at right angles to the preceding ones, are also provided in plate 5 to receive the lower ends of rods 7 and thus to define the pivot axis YY.

The inner wall of the cover 10 of support 6 is so shaped that weight members 1 and 2 can pivot freely about their respective axes but that the lower ends of rods 4 and 7 cannot escape from their respective housings provided in plate 5, even if the apparatus is placed upside down.

Plate 5 may be fixed on support 6 after weight members 1 and 2 have been introduced into the body 6 of said support, and plate 5 and cover 10 are preferably fixed in fluid-tight manner on said body 6, for instance by welding, after adjustment and checking of the position of the weight members.

The body 6 of the support carries, opposite weight member 1, two electric contacts 11 connected with said support through insulating parts 12. Contacts 11 are in line with each other along a direction at right angles to axis XX whereby weight member 1 comes into abutment with either of said contacts according to the direction in which said member has been tilting. Of course, holes 13 are provided in the body of weight member 2 to permit the passage of contacts 11 which must have their ends as close as possible to weight element 1, for instance at points at a distance therefrom averaging 5/100 of a millimeter.

Two contacts 14, arranged similarly to contacts 11 but extending in a direction at right angles to that of said contacts 11, are provided on support 6. In this case also, the ends of said contacts 14 must be normally located at a distance averaging 5/100 of a millimeter from weight member 2.

Advantageously, contacts 11 and 14 are constituted by rods of platinum iridium (containing for instance 15% of iridium and anyway a percentage of iridium higher than that existing in the metal of the weight members). Said rods 11 and 14 are welded in parts 12. These contacts and members 1 and 2 are inserted in an electric system which will be hereinafter described.

Advantageously, the centre of percussion (or centre of oscillation) of every weight member with its supporting rods must be very close to the centre of gravity thereof and must coincide substantially with the point of intersection of the axes of contacts 11 and 14.

In order to have the inside of the apparatus always in the same pressure conditions, it is advantageous to evacuate the air contained in support 6 and to replace it by an inert gas, these operations being for instance effected through a tube 15 passing through end plate 5.

The presence of this inert gas further improves the resistance of platinum to oxiding.

In order to enable support 6 to return weight members 1 and 2 toward their position of equilibrium in the field of apparent gravity, said support is mounted so as to have two degrees of freedom about two axes $Z_1$—$Z_1$ and $Z_2$—$Z_2$ at right angles to each other with respect to a base 16 rigid with the aircraft. Advantageously, axis $Z_1$—$Z_1$ is parallel to the longitudinal axis of said aircraft and axis $Z_2$—$Z_2$ tends to remain parallel to the apparent horizontal plane.

For this purpose, support 6 is fixed with respect to an annular piece 17 oscillable about axis $Z_2$—$Z_2$ between the arms of a fork 18 itself oscillable about axis $Z_1$—$Z_1$ with respect to base 16.

The fixation of support 6 with respect to annular piece 17 is adjustable by displacement in a direction parallel to the geometrical axis W—W of the weight members, support 6 being slidable in the direction of said axis in a ring member 32 rigid with said piece 17 and being secured in the desired position of adjustment by a fixation screw 33.

Ring member 32 carries insulated resilient metal plates 34 to ensure electrical connections with the outer ends of contacts 11 and 14 whatever be the axial position of support 6 in ring member 32.

On the figures with reference to which my apparatus and its operation are described, the point of intersection of axes $Z_1$—$Z_1$ and $Z_2$—$Z_2$ coincides with the point of intersection of the axes of the contacts 11 and 14 which limit the movement of weight members 1 and 2 with respect to support 6.

Now, in working conditions, these intersection points should be offset in a suitable direction, which is tantamount to reducing the play between the weight members and the contacts, and therefore the amplitude of displacement of the weight members with respect to the support. This offsetting is made possible by the adjustable mounting of support 6 in ring member 32.

Rotation of piece 17 with respect to fork 18 is achieved by means of an electric motor 19 (for instance a two-phase motor) capable of running in one direction or in the opposite one.

Rotation of fork 18 with respect to base 16 is achieved by means of a motor 20 similar to motor 19.

Preferably, these two motors 19 and 20 drive the elements which they control through a reducing gear, for instance of the type including a worm and worm wheel. Fig. 4 shows how fork 18 is actuated by motor 20 (Fig. 5) through such gearing 21—22. Motor 19 similarly actuates piece 17.

These motors 19 and 20 are started, and their direction of rotation is controlled, by the detector weight members 1 and 2. Weight member 1 controls motor 19 (it being supposed that the pivot axis X—X of said weight member 1 is in a plane at right angles to axis $Z_1$—$Z_1$ when fork 18 is rotating about axis $Z_1$—$Z_1$) and weight member 2 then controls motor 20.

Fig. 6 shows the electric lay-out of motors 19 and 20.

Each of the weight members acts as a reversing switch controlling the phases of the corresponding motor, the circuit of each phase being closed through a circuit having a middle point.

23 is the primary circuit of a feed transformer the secondary circuits 24 and 25 of which serve to feed motors 19 and 20 respectively.

The middle points of secondary circuits 24 and 25 which control motors 19 and 20 are designated by reference character $o$ and the windings of the motors are respectively designated by $19a$, $19b$ and $20a$, $20b$.

I will now explain how motor 19 is controlled by weight member 1, the control of motor 20 by weight member 2 taking place similarly.

If weight member 1, which is grounded, comes to bear against contact $11a$, the current flows through control winding $19a$ in the direction indicated by the arrow (for an instantaneous polarity of the feed network indicated by the + and — signs on the drawing). On the contrary, if weight member 1 bears against the other contact $11b$, the current will flow in the opposed direction. Thus, motor 19 will be started every time weight member 1 comes into abutment with either of contacts $11a$ and $11b$, the direction in which said motor runs being determined by which of these contacts is brought into play.

My apparatus includes means, and preferably electrical means, for defining, by means of two angular coordinates, the direction into which the system above described returns the common geometrical axis W—W of weight members 1 and 2, which axis defines the direction of the apparent vertical, this direction being obviously parallel to the mean position of the axis of support 6.

Advantageously, as shown by the drawings, such means are constituted by two potentiometers 26 and 27 cooperating with the respective shafts of annular member 17 and fork 18 respectively, the sliding members of said potentiometers being directly mounted on said shafts and their resistor elements being respectively connected to fork 18 and support 16.

Connection of the contacts of the detector weight members, of the motors and of the potentiometers with the external electrical networks may be obtained by means of rotating distributors including rings and brushes 28 and 29 mounted respectively on the above mentioned shafts.

Finally it may be advantageous to place, on each of the axes of the worms 21 of the reducing gears, means 30 or 31 for damping erratic impulses. Such means consist of a damping device of any suitable type, interposed with a suitable play in the transmission between each of the motors 19 and 20 and the parts 17 and 18 respectively driven by said motors. The play corresponds to the amplitude of oscillation of support 6 in normal operation so that the damping device is brought into action only for oscillations of greater amplitude, which is the case of those produced by said erratic impulses.

Such an apparatus works as follows:

The apparatus being at rest, there is practically no chance of the common axis of detecting weight members 1 and 2 being in accurate coincidence with the apparent vertical, so that said weight members 1 and 2 are both bearing upon one of the contacts located on either side thereof. As soon as the electric connections are switched in, motors 19 and 20 are brought into action and modify the direction of annular piece 17 so that the axis of the weight members is moved toward the apparent vertical. As soon as the apparent vertical has been reached by this axis, the weight members which are in unstable equilibrium leave the contacts on which they were resting so that the motors are disconnected, but as above stated the equilibrium is unstable, and as soon as the common axis of weight members 1 and 2 has moved beyond the apparent vertical, the opposed contacts are operated and motors 19 and 20 are again operated in directions opposed to the preceding ones so as again to reduce the difference between the apparent vertical and the new position of the common axis of the weight members.

Thus, for practical purposes, this axis is kept moving so as to be always substantially parallel to the desired direction, with only a very small deviation corresponding to the very short time of response of motors 19 and 20, which have a low inertia.

When the aircraft or the body on which the apparatus is mounted is under static conditions, the axis of the weight members is thus subjected to restoring movements of low amplitude on either side of the exact direction of the apparent vertical.

Some aberrant impulses which might be produced by the effect of an abnormal contact are absorbed by parts 30 and 31.

Figure 7:
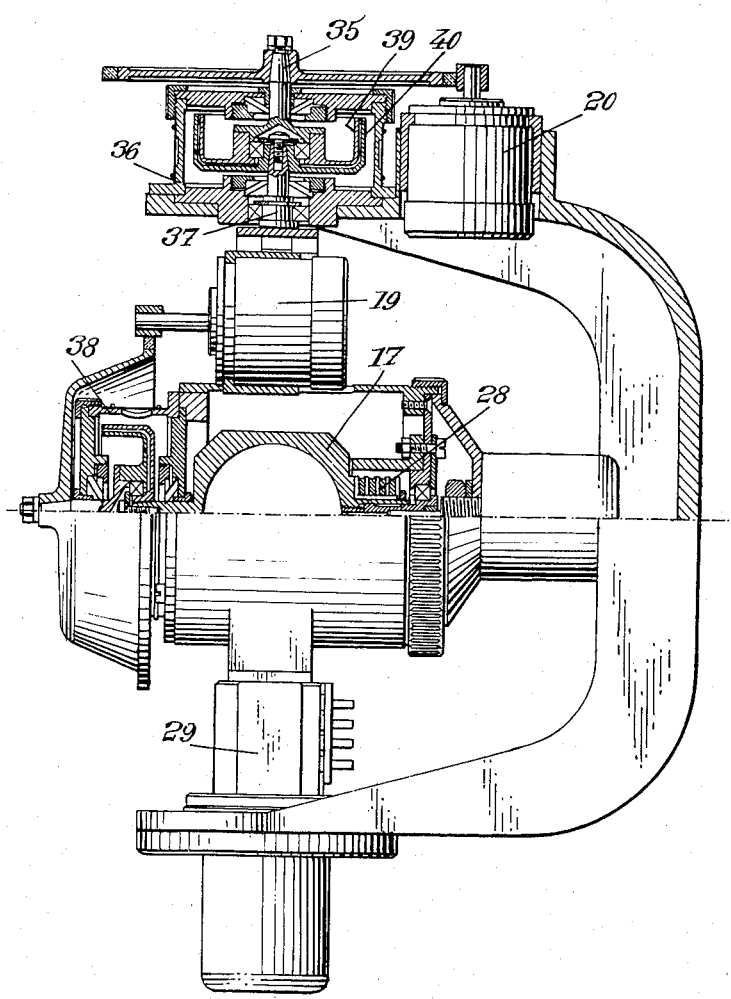
Fig. 7 is a view, partly in section, showing a modification of my apparatus.

In a modification of my invention illustrated by Fig. 7, instead of making use of mechanical reducing gears (which necessarily introduce plays in the transmission), one of the motors, 20 for instance, acts either directly, or through reducing means of the frictional type on the input shaft 35 of a fluid transmission device 36 the output shaft 37 of which carries a movable unit including the second motor 19 and the annular piece 17 which carries the detector means (i. e. support 6 containing weight members 1 and 2).

Motor 19 may then advantageously control the pivoting movement of piece 17 through a fluid transmission 38 similar to transmission 36.

Fluid transmissions 36 and 38 may include for instance coaxial sleeves 39 and 40 respectively rigid with the input shaft and the output shaft of the fluid transmission, said sleeves being immersed in a stable viscous fluid, such for instance as a suitable silicone.

With such an apparatus, transmission of the movements is effected without play, the drive taking place in a progressive fashion at a speed which is an increasing function of the difference between the speeds of the input shaft and the output shaft of the device (i. e. an increasing function of the error to be reduced) and finally the movements are damped, both on the side of the motor and on the side of the element that is driven.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for determining the direction of the apparent vertical on a movable body which comprises, in combination, a support pivotably mounted on said body, a weight member of parallelepipedal shape, a cross member rigid with the base of said member, two pointed rods parallel to each other rigid with said cross member, said support including an end plate for accommodating the lower pointed ends of said rods, a second weight member constituted by a sleeve of quadrangular cross section surrounding said first mentioned weight member with a small play and two rods rigid with said second weight member parallel to the two first mentioned rods but located in a plane at right angles to the plane of the two first mentioned rods, said lower plate of said support being adapted to accommodate the pointed lower ends of the two second mentioned rods, contact means for limiting the pivoting displacement of said weight members with respect to said support about the lines determined by the pointed ends of the first pair of rods and of the second pair of rods, and motor means operative by said contact means for pivoting said support to tend at any time to restore said weight members into position of equilibrium with respect to said axes.

2. An apparatus according to claim 1 in which said weight members are made of platinum iridium containing about 5% of iridium.

3. An apparatus according to claim 1, said support including a cover shaped to enable the two weight members to oscillate freely without interference from said cover but to prevent the lower ends of said rods from moving substantially away from the lower plate of said support.

4. An apparatus for determining the direction of the apparent vertical on a movable body which comprises, in combination, a support pivotably mounted on said body about a point thereof, two weight members pivotably mounted in said support about two respective axes at right angles to each other fixed with respect to said support, the gravity centres of said weight members being located above said axes, two electric contacts carried by said support and extending in a direction transverse to the pivot axis of one of said members, said electric contacts being adapted to cooperate with said last mentioned weight member on opposite side thereof, two electric contacts carried by said support and extending in a direction transverse to the pivot axis of the other of said members, said electric contacts being adapted to cooperate with said last mentioned weight member on opposite sides thereof, said weight members being entirely free to oscillate in said support between said contacts respectively, electric motor means carried by said body and operative by said electric contacts, said motor means being mounted to pivot said support with respect to said body in a direction opposed to that in which said weight members are tilted from the vertical so as to cause said contacts always to push back said weight members toward the vertical position, and electrical means for defining two angular coordinates indicating the direction of the mean position of the axis of said support perpendicular to both of said first mentioned axes.

5. An apparatus according to claim 4 in which the centre of percussion of each of the weight members is very close to the centre of gravity thereof and substantially in coincidence with the point of intersection of the axes of said electric contacts.

6. An apparatus according to claim 1 in which said support constitutes a gas-tight container and is filled with an inert gas.

7. An apparatus according to claim 4, said electrical means consisting of potentiometers.

8. An apparatus for determining the direction of the apparent vertical of a movable body which comprises, in combination, a support pivotably mounted on said body about an axis, a weight member pivotably mounted with respect to said support about an axis parallel to said first mentioned axis, the gravity center of said weight member being above said second mentioned axis, two electric contacts carried by said support and extending in a substantially horizontal direction transverse to said axes, said electric contacts being adapted to cooperate with opposed walls of said weight member respectively, said weight member being entirely free to oscillate with respect to said support between the limit positions thereof determined by its cooperation with said respective contacts, electric motor means carried by said body and operative by said electric contacts, said motor means being mounted to be energized by each of said contacts to pivot said support with respect to said body in a direction opposed to that in which said weight member is tilted from the vertical to bear against said contact, so as to cause said contact to push back said weight member toward the vertical, and means for determining the mean position of the axis of said support defined by a line passing through a point halfway between the ends of said contacts and at right angles to said first mentioned axis.

References Cited in the file of this patent
UNITED STATES PATENTS

| | | |
|---|---|---|
| 1,154,396 | Hayot | Sept. 21, 1915 |
| 1,485,783 | Gardner | Mar. 4, 1924 |
| 2,193,707 | Baumann | Mar. 12, 1940 |
| 2,278,846 | Goerth | Apr. 7, 1942 |
| 2,294,201 | Pepper | Aug. 25, 1942 |
| 2,494,109 | Wolfe | Jan. 10, 1950 |
| 2,497,607 | Herr | Feb. 14, 1950 |
| 2,623,714 | Slater | Dec. 30, 1952 |